(12) United States Patent
Fukuno et al.

(10) Patent No.: US 6,612,956 B2
(45) Date of Patent: Sep. 2, 2003

(54) FRONT-REAR AXLE DRIVING TORQUE TRANSMISSION APPARATUS

(75) Inventors: Toshihiro Fukuno, Komatsu (JP); Makoto Toyama, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 28 days.

(21) Appl. No.: 09/725,962

(22) Filed: Nov. 30, 2000

(65) Prior Publication Data
US 2001/0003719 A1 Jun. 14, 2001

(30) Foreign Application Priority Data
Dec. 10, 1999 (JP) .......................... 11-351886

(51) Int. Cl.[7] ............................................. F16H 37/08
(52) U.S. Cl. .................... 475/199; 475/84; 475/249; 180/249
(58) Field of Search ................. 475/86, 249, 199, 475/84, 6, 248, 250, 253, 220; 180/248, 249

(56) References Cited

U.S. PATENT DOCUMENTS

| | | | | |
|---|---|---|---|---|
| 3,323,389 A | * | 6/1967 | Hause | 475/86 X |
| 3,814,222 A | * | 6/1974 | Koivunen | 475/249 X |
| 3,899,938 A | | 8/1975 | Crabb | |
| 4,074,591 A | * | 2/1978 | Dick | 475/249 |
| 4,535,651 A | * | 8/1985 | Chambers | 475/249 X |
| 4,718,302 A | * | 1/1988 | Nussbaumer et al. | 475/86 |
| 4,976,671 A | | 12/1990 | Andersson | |
| 5,006,099 A | * | 4/1991 | Muller et al. | 475/86 |
| 5,527,229 A | * | 6/1996 | Ishihara et al. | 475/249 |

FOREIGN PATENT DOCUMENTS

FR 2609137 * 12/1986 ............. 180/249 X

* cited by examiner

Primary Examiner—Charles A Marmor
Assistant Examiner—Ha Ho
(74) Attorney, Agent, or Firm—Armstrong, Westerman & Hattori, LLP

(57) ABSTRACT

A front-rear axle driving torque transmission apparatus, which can improve a degree of freedom with respect to a change of torque distribution to a front wheel driving axle and a rear wheel driving axle by making the best use of a wet-type multiple disc clutch. The front-rear axle driving torque transmission apparatus includes: power input means; differential planetary gear driving means for rotating a front wheel side output shaft and a rear wheel side output shaft at a different rotational speed on the basis of a power inputted by the power input means; and clutch means for locking an operation of the differential planetary gear driving means so that the front wheel side output shaft and the rear wheel side output shaft can be rotated at the same rotational speed. The apparatus has a structure in which the power input means, the differential planetary gear driving means and the clutch means are successively arranged as a unit on an identical axial line in a state of crossing between the rear wheel side output shaft and the front wheel side output shaft arranged on the identical axial line.

3 Claims, 1 Drawing Sheet

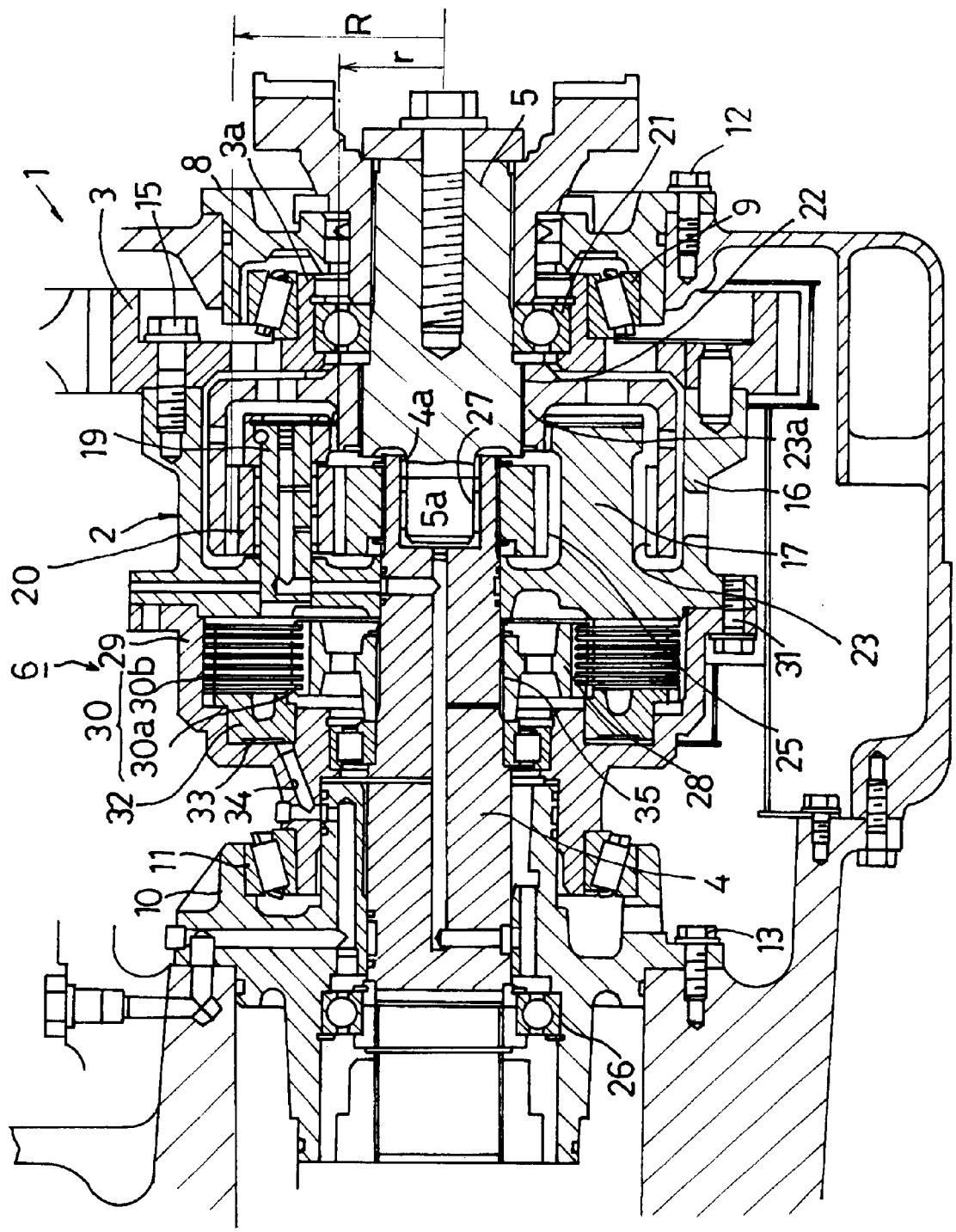

FRONT-REAR AXLE DRIVING TORQUE TRANSMISSION APPARATUS

TECHNICAL FIELD

The present invention relates to a torque transmission apparatus for a vehicle having front-rear (two) driving axles, and in particular, to a front-rear axle driving torque transmission apparatus, which includes a differential gear means having a degree of freedom in setting a capacity of a clutch.

BACKGROUND OF THE INVENTION

Various driving torque transmission systems for vehicles having front-rear driving axles have been already proposed, and have been practically used. Most of these systems uses a planetary differential gear so as to rotate a front axle and a rear axle at a different speed, and includes a clutch (lock operation is possible). The clutch is constructed in a manner of mutually coupling front-rear output shafts when a vehicle is running so as to prevent a differential rotation of the front-rear axles, and thereby, when one axle slips on and the other axle loses a driving force, transmitting a driving torque to the one which has no driving force.

Moreover, a dog clutch and a wet-type multiple disc clutch have been well known as the above clutch. In this case, the latter, that is, the wet-type multiple disc clutch has a structure in which the clutch is provided in an inner diametrical portion of an input gear on a first output shaft, as disclosed in Japanese Unexamined Patent Publication No. 50-147027, for example. The wet-type multiple disc clutch disclosed in Japanese Unexamined Patent Publication No. 50-147027 has the following merits. More specifically, a lock operation is possible during vehicle driving, and it is possible to reduce the number of components such as gears, bearings or the like, and thus, the structure can be simplified and made into a compact size as a whole.

However, in the case of the former, that is, the dog clutch, there is a problem such that no operation is made during vehicle driving. On the other hand, in the case of the latter, that is, the wet-type multiple disc clutch, there is a problem such that a degree of freedom is reduced because an installation space is limited in the case of changing a clutch capacity. More specifically, the clutch is situated in an input gear; for this reason, there is a problem such that it is difficult to readily make a modification for increasing a clutch capacity by increasing the number of clutch plates or enlarging a clutch disc diameter, for example.

The present invention has been made in view of the aforesaid problems in the prior art. It is, therefore, an object of the present invention to provide a front-rear axle driving torque transmission apparatus which is constructed in a manner that a front axle and a rear axle across between adjacent shafts, and an input gear, planetary differential gear means and a clutch are mounted as a unit in succession in an axial direction so as to improve a degree of freedom for setting.

DISCLOSURE OF THE INVENTION

In order to achieve the above object, the present invention provides a front-rear axle driving torque transmission apparatus, comprising: power input means; differential planetary gear driving means for rotating a front wheel side output shaft and a rear wheel side output shaft at a different rotational speed on the basis of a power inputted by the power input means; and clutch means for locking an operation of the differential planetary gear driving means so that the front wheel side output shaft and the rear wheel side output shaft can be rotated at the same rotational speed, the power input means, the differential planetary gear driving means and the clutch means being successively arranged as a unit in an axial direction in a state of crossing between the rear wheel side output shaft and the front wheel side output shaft arranged on the identical axial line.

According to the above construction of the present invention, the clutch means controls a lock state and a unlock state between the front and rear side output shafts, and further, the clutch means is arranged in an independent state on the side of the differential planetary gear driving means. Therefore, in the case of changing a capacity of the clutch means, a dimension of the clutch plate of the multiple disc clutch is freely changed, and also, the number of clutch plates is freely increased and decreased. Further, there is no limitation in the installation space, and thereby, it is possible to improve a degree of freedom with respect to a change. Furthermore, the clutch means is independently made into a unit, and thereby, it is possible to readily perform a maintenance for the clutch means.

In the present invention, preferably, the differential planetary gear driving means and the clutch means are arranged in a housing which crosses between the rear wheel side output shaft and the front wheel side output shaft arranged on the identical axial line, and is rotated around the axis integrally with the power input means. By this arrangement, the differential planetary gear driving means is made into a unit, and is firmly connected with the power input means, and thereby, it is possible to make compact a driving torque transmission apparatus.

Moreover, preferably, the housing rotating integrally with the power input means is composed of a housing integrally including a power input carrier of the differential planetary gear driving means, and a clutch housing of the clutch means. By this arrangement, the clutch means is independently made into a unit with respect to the differential planetary gear driving force, and thereby, it is possible to readily perform a maintenance for the clutch means.

In this case, preferably, the housing integrally including the power input carrier of the differential planetary gear driving means is a housing which is formed integrally with a carrier rotatably supporting a planetary gear around a coupled portion where the rear wheel side output shaft and the front wheel side output shaft are fitted, and the differential planetary gear driving means is included in the housing so that a ring gear connected with the rear wheel side output shaft by spline fitting and a sun gear connected with the front wheel side output shaft by spline fitting are engaged with the planetary gear. By this arrangement, each member of the differential planetary gear driving means is compactly received in the housing, and also, a load (weight) is ideally shared to each member.

Moreover, preferably, the clutch housing of the clutch means is provided with a hydraulic operating type ring-like disc clutch pack which locks the clutch housing, the front wheel side output shaft and the power input carrier so that they are coupled integrally. By this arrangement, it is easy to form an oil pressure circuit for operating a piston for pressing and releasing a clutch disc. Further, a clutch oil pressure is controlled, and thereby, it is possible to change a torque distribution by controlling an unlock state that the clutch oil pressure is zero and a lock state that the clutch is turned on by the oil pressure, and an intermediate oil pressure, and thus, to obtain a well functioned driving torque transmission apparatus.

BRIEF DESCRIPTION OF THE DRAWINGS

The solo FIGURE is a longitudinal sectional view showing a front-rear axle driving torque transmission apparatus according to one embodiment of the present invention.

BEST MODE FOR CARRYING OUT THE INVENTION

Next, one embodiment of a front-rear axle driving torque transmission apparatus according to the present invention will be detailedly described below with reference to the accompanying drawing.

The solo FIGURE is a longitudinal sectional view showing a front-rear axle driving torque transmission apparatus according to one embodiment.

A two-axle driving torque transmission apparatus (hereinafter, referred to as "torque transmission apparatus") 1 of this embodiment includes differential planetary gear driving means 2, an input gear 3 (power input means), a front wheel side output shaft 4, and a rear wheel side output shaft 5. More specifically, the input gear 3 is engaged and coupled with a vehicle transmission gear train. The front wheel side output shaft 4 is operatively coupled to a front wheel side axle (not shown) of a vehicle, and the rear wheel side output shaft 5 is operatively coupled to a rear wheel side axle (not shown) of a vehicle and arranged on the same axial line as the front wheel side output shaft 4. In this case, the front wheel side output shaft 4 and the rear wheel side output shaft 5 are relatively rotatable. Moreover, the differential planetary gear driving means 2 is additionally provided with torque distribution means 6 (hereinafter, referred to as clutch means 6), which comprises a multiple disc clutch. The clutch means 6 blocks a relative rotation of the front wheel side output shaft 4 and the rear wheel side output shaft 5, and gives a high driving force to one axle when the other axle loses a driving force. The input gear 3 is positioned on the side opposite to the clutch means 6.

The differential planetary gear driving means 2 is mounted between the input gear 3 and the clutch means 6. The input gear 3 is rotatably supported onto a stationary housing 8 by a bearing 9 and the clutch means 6 is rotatably supported onto a stationary housing 10 by a bearing 11. These stationary housings 8 and 10 are fitted into a transmission gear case (box), and then, are fixed by a plurality of bolts 12 and 13 respectively.

The differential planetary gear driving means 2 has a housing (power input housing) 16, a carrier member 17, and a plurality of planetary gears 20. More specifically, the housing 16 has a bucket shape having an opening portion at a mounting portion side with the input gear 3 (attached by a bolt 15 on the end face). The carrier member 17 is formed with a support beam which is integrally projected from a housing bottom wall toward an axial direction at equal intervals in a circumferential direction in the housing 16, and with a ring-like wall (not shown) at one end of the support beam. The planetary gears 20 are received between the intervals of the support beam of the carrier member 17, and are supported by a support shaft 19 which is arranged parallel with the axial line between a bucket bottom wall and a ring-like wall. Moreover, a planetary gear mechanism is constructed in the following manner. More specifically, a ring gear 23 is engaged with the plurality of planetary gears 20 held on the carrier member 17. The ring gear 23 is fitted into a spline 22 formed at an outer circumference of the rear wheel side output shaft 5. The rear wheel side output shaft 5 is penetrating through the center of a boss portion 3a of the input gear 3 in the axial direction and supported by a bearing 21 via a proximal boss 23a. In this case, the input gear 3 is formed like a cover which covers the opening portion of the housing 16 including the above planetary gear mechanism.

As described above, the differential planetary gear driving means 2 is compactly received in the bucket power input housing 16 coupled with the input gear 3 which is power input means, and each component of the differential planetary gear are positioned on the substantially central portion of the housing 16. By this arrangement, a load acting on each component can be ideally shared in the case where a torque is transmitted from the input gear 3 to each of output shafts 4 and 5.

A sun gear 25 engaging with the planetary gear 20 of the above planetary gear mechanism is mounted on the end portion of the front wheel side output shaft 4 by spline fitting. The front wheel side output shaft 4 is supported by a bearing 26 penetrating through the axis of the other stationary housing 10. Further, front wheel side output shaft 4 is coaxially fitted and supported so as to be relatively rotatable via the distal end portion 5a of the rear wheel side output shaft 5 having a diameter smaller than a distal hole portion 4a and via a needle bearing 27. The planetary gear mechanism transmits an input torque transmitted by the input gear 3 to the sun gear 25 and the ring gear 23. The sun gear 25 is fixed to the front wheel side output shaft 4 by a revolution of the carrier member 17 (carrier) and a rotation of the planetary gear 20, and the ring gear 23 is fixed to the rear wheel side output shaft 5. The input torque is distributed to the front wheel side output shaft 4 (front driving wheel) and the rear wheel side output shaft 5 (rear driving wheel) according to the number of teeth of the sun gear 25 and the ring gear 23 and a pitch radius r of the sun gear and a pitch radius R of the ring gear. These front wheel side output shaft 4 and rear wheel side output shaft 5 are rotated at different speed.

Moreover, the clutch means 6 has a multiple disc clutch 30, which is constructed in a manner that a plurality of clutch discs 30a and clutch plates 30b are combined. The clutch discs 30a are slidably supported in an axial direction so that its inner diameter side is engaged with a gear-like retaining member 28 which is fixed on the front wheel side output shaft 4 by an engagement of a spline 35 and has teeth formed on its outer periphery. The clutch plates 30b is slidable in an axial direction so that its outer diameter side is supported so as to be engaged with many teeth formed at an inner side of a clutch housing 29. The outer peripheral portion on the proximal portion of the clutch housing 29 is coaxially supported to the stationary housing 10 via the bearing 11. The clutch housing 29 is constructed in a manner that the opposite side of a side supported by the stationary housing 10 is coaxially coupled to the side of the housing 16 (carrier) of the differential planetary gear driving means 2 by a plurality of bolts 31.

As described above, the power input means (input gear 3), the differential planetary gear driving means 2 and each unit of the clutch means are coaxially arranged in a traverse direction so as to cross over the front-rear wheel side output shafts. In the case where a specification change is required in a vehicle equipped with the above torque transmission apparatus or in the case where the torque transmission apparatus is equipped in a family vehicle having a different specification, a design change is required in view of strength. In such a case, since each unit of the clutch means 6 is independently arranged in a transverse direction without being overlapped, it is possible to freely make a change of reduction gear ratio by the power input means, a change of reduction gear ratio of the differential planetary gear driving means, a change of tooth width, a change of clutch capacity (e.g., increase and decrease of the number of clutch discs, change of disc diameter).

Moreover, the input gear 3 and the housing 16 of the differential planetary gear driving means 2 are coupled with each other, and further, the housing 16 is coupled with the clutch housing 29. Therefore, each of these components are made into a unit, and firmly and compactly assembled, and further, each unit is coupled in each housing. By this arrangement, it is possible to readily perform a maintenance.

The above multiple disc clutch 30 is provided with a pressure operating piston (hydraulic operation type ring piston) 32 at its one side (opposite to the mounting surface with the carrier). The pressure operating piston 32 uses a hydraulic fluid (oil pressure) supplied from the outside in the clutch housing 29 as a drive source. The pressure operating piston 32 is operated in the following manner. More specifically, by opening and closing a control valve (not shown) via a hydraulic fluid passage 34 shown in the solo FIGURE, when a hydraulic fluid is supplied to a pressure chamber 33 formed on the back of the piston from a pressure source (not shown) of the outside, the piston 32 is advanced. Thereafter, the piston 32 is pressed against the carrier member 17 of the differential planetary gear driving means 2 when a pressing force is sufficiently urged to the clutch disc 30a and the clutch plate 30b, and thus, a relative rotation of the clutch disc 30a and the clutch plate 30b is blocked. Then, the carrier member 17 and the front wheel side output shaft 4 are coupled so that a driving torque can be directly transmitted from the input gear 3 to the front wheel side output shaft 4.

Further, the pressure operating piston 32 has a structure in which an operating pressure is directly urged in the side of the multiple disc clutch 30. Therefore, a dimension of the operating surface of the piston 32 can be set so as to correspond to the operating surface of the clutch plate 30b. Accordingly, it is possible to obtain a effective operating force in a small space. The pressure operating piston 32 loses a thrust force when the supply of hydraulic fluid is disconnected; therefore, the piston 32 is returned to the initial state because a force for blocking a relative rotation by the multiple disc clutch 30 is lost.

In the torque transmission apparatus 1 of this embodiment, usually, the multiple disc clutch 30 of the clutch means 6 is in a non-operating state, and the differential planetary gear driving means 2 functions so that the front wheel side output shaft 4 and the rear wheel side output shaft 5 can be relatively rotated. Therefore, the front driving wheel and the rear driving wheel are rotated at a different angular velocity. The different angular velocity is set according to a gear ratio in the differential gear (planetary gear mechanism), as described before.

During driving, for example, when the front wheel slips and the rear driving axle loses a driving force of vehicle, a vehicle driver operates a hydraulic fluid supply means (hydraulic fluid control valve, etc.) so that the hydraulic fluid is supplied to the pressure chamber 33 of the pressure operating piston 32. Whereupon, the pressure operating piston 32 is pressed so as to operate the multiple disc clutch 30, and thereby, a driving torque by the input gear 3 is directly transmitted to the front wheel side output shaft 4 (in a locked state) via the housing 16 (carrier) of the differential planetary gear driving means 2 and the clutch housing 29 of the clutch means 6 coupled by the bolt 31 with the housing 16. Simultaneously, the carrier member 17 and the front wheel side output shaft 4 are rotated integrally with each other. In this state, the sun gear 25 drives the ring gear 23 which is integrated with the planetary gear 20 and the rear wheel side output shaft 5.

Therefore, a relative rotation is blocked between the front wheel side output shaft 4 (front driving axle) and the rear wheel side output shaft 5 (rear driving axle), and thus, a driving torque is transmitted to the rear driving axle losing a driving force. In this case, the multiple disc clutch 30 of the clutch means 6 has a structure of slipping when the driving torque exceeds a predetermined torque. Therefore, this serves to prevent an operating part or the like from being broken down by an excessive torque. Moreover, the hydraulic fluid to the multiple disc clutch 30 is controlled so that the clutch means 6 is made into a partial clutch engagement state, and thereby, it is possible to freely change a torque distribution to the front-rear wheel side output shafts.

According to this embodiment as described above, in a vehicle including a multiple driving axle, an optimum torque can be distributed in accordance with a weight ratio relative to front and rear axles of a vehicle body. Further, during driving, a so-called two-axle lock operation of the front and rear wheel sides is performed; therefore, it is possible to readily drive a vehicle under a worse road condition.

In the above embodiment, the input gear 3 has been arranged near the rear wheel side output shaft 5 of the differential planetary gear driving means 2. The present invention is not limited to this embodiment, and the input gear 3 may be arranged on a position other than a radius direction of the portion where the multiple disc clutch 30 constituting the clutch means 6 is arranged. By this arrangement, the above object can be achieved. Moreover, the housing structure of the differential planetary gear driving means 2 is not limited to this embodiment. For example, although not illustrated, the input gear and the carrier may be coupled by using a stud bolt so long as the input gear 3 and the carrier of the planetary gear 20 of the differential gear (differential gear mechanism) are coupled.

What is claimed is:

1. A front-rear axle driving torque transmission apparatus, comprising:

power input means;

differential planetary gear driving means for rotating a front wheel side output shaft and a rear wheel side output shaft at a different rotational speed on the basis of a power inputted by the power input means; and clutch means for locking an operation of said differential planetary gear driving means so that said front wheel side output shaft and said rear wheel side output shaft can be rotated at the same rotational speed, said power input means, said differential planetary gear driving means and said clutch means being successively arranged as a unit on an identical axial line in a state of crossing between the rear wheel side output shaft and the front wheel side output shaft arranged on the identical axial line, wherein said differential planetary gear driving means and said clutch means are arranged in a housing which crosses between the rear wheel side output shaft and the front wheel side output shaft arranged on the identical axial line, and is rotated around the identical axial line integrally with said power input means, and the housing rotating integrally with said power input means is composed of a clutch housing of said clutch means and a power input housing which are coupled together by a plurality of bolts, said power input housing including a power input carrier of said differential planetary gear driving means, and said power input housing and said power input carrier being a one-piece component of the transmission apparatus.

2. The front-rear axle driving torque transmission apparatus according to claim 1, the power input housing, which includes the power input carrier of said differential planetary gear driving means, is a housing which is formed with the carrier rotatably supporting a planetary gear around a coupled portion where said rear wheel side output shaft and said front wheel side output shaft are fitted, and said differential planetary gear driving means is included in said power input housing so that a ring gear connected with said rear wheel side output shaft by a spline fitting and a sun gear connected with said front wheel side output shaft by a spline fitting are engaged with said planetary gear.

3. The front-rear axle driving torque transmission apparatus according to claim 1, wherein the clutch housing of said clutch means is provided with a hydraulically operated ring-like disc clutch pack which locks the clutch housing, said front wheel side output shaft and the power input carrier so that they are coupled integrally.

* * * * *